United States Patent [19]
Kodali

[11] Patent Number: 5,880,300
[45] Date of Patent: Mar. 9, 1999

[54] PHOSPHOLIPID-BASED REMOVAL OF STEROLS FROM FATS AND OILS

[75] Inventor: Dharma R. Kodali, Plymouth, Minn.

[73] Assignee: Cargill, Incorporated, Wayzata, Minn.

[21] Appl. No.: 791,915

[22] Filed: Jan. 31, 1997

[51] Int. Cl.$^6$ ..................................................... C11B 3/00
[52] U.S. Cl. .......................... 554/190; 426/417; 426/601
[58] Field of Search .............................. 584/190; 426/601, 426/417

[56] References Cited

U.S. PATENT DOCUMENTS

| | | |
|---|---|---|
| 4,804,555 | 2/1989 | Marschner et al. . |
| 4,996,072 | 2/1991 | Marschner et al. . |
| 5,024,846 | 6/1991 | McLachlan et al. . |
| 5,026,565 | 6/1991 | McLachlan et al. . |
| 5,128,162 | 7/1992 | Wrezel et al. . |
| 5,616,359 | 4/1997 | Heidlas et al. . |

FOREIGN PATENT DOCUMENTS

| | | |
|---|---|---|
| 0 493 045 A1 | 7/1992 | European Pat. Off. . |
| WO96/08547 | 3/1996 | WIPO . |
| WO97/24420 | 7/1997 | WIPO . |
| WO97/28604 | 7/1997 | WIPO . |

OTHER PUBLICATIONS

Chem. abstr, Borodin et al., 100:206112, 1984.
Borodin et al., "The Extraction of Cholestrol From Erythrocyte Ghosts With Phospholipids," *Voprosky Meditsinskoy Khimii* [*Issues in Medical Chemistry*], 30:75–7 (1984) (English Translation; 7 pp.)
Alberts et al., *Molecular Biology of the Cell*, 3rd Ed., Publisher: Garland Publishing Inc., New York, NY, pp. 478, 481–482, 485–495, 659 (1994).
*Bailey's Industrial Oil and Fat Products*, 5th Ed., vol. 3, Publisher: John Wiley & Sons Inc., Editor: Y.H. Hui, pp. 16–22 (1996).
Erickson (ed.) Pract. Handbook of Soybean Proc. & Util., AOCS Press & United Soybean Board, Ch. 10, 1995.
Chao et al., JAOCS, 70:139–143, 1993.
The Cheese Reporter, "Process for Removing Most Cholestrol From Dairy Fats Introduced", Jun. 23, 1989.
The Chemist, vol. 71, #5, "News Notes for the AIC Membership", Jul. 1994.
Food engineering, "Supercritical extraction holds promise for cholestrol–free butter", Feb. 1989.
Hamilton, Inform, vol. 1, #9, pp. 810–819, 1990.
Huang et al., JAOCS, 73:245–251, 1996.
McNeill et al., JAOCS, 73:1403–1407, 1996.
Miller et al., J. of Colloid and Interface Science, 89:466–478, 1982.
"Diet and Coronary Heart Disease", Report No. 107, pp. 1–11, 1985.
Snyder, Sorbean Utilization, pp. 37–39, 1987.
Snyder, Soybean Utilization, pp. 68–70, 1987.
Spalding, Chemical Week, pp. 66–67, 1987.
Sperber, Food Processing, pp. 154–160, 1989.
Food Science & Technology, vol. 7, #1 [67 ], p. 29, 1996.
Kirk–Othmer, Encyclopedia of Chem. Technology, 4th Edition, pp. 125–180, 1993.
Szuhaj and List (eds.) , Lecithins, AOCS, Chapter 2, 1985.
J. Davies, Lipid Technology, pp. 7–13, Jan.–Feb. 1992.

*Primary Examiner*—Gary Geist
*Assistant Examiner*—Deborah D. Carr
*Attorney, Agent, or Firm*—Fish & Richardson P.C., P.A

[57] ABSTRACT

Disclosed is a method for reducing the sterol, for example cholesterol, content of sterol-containing substances such as fats and oils. The method provides an efficient and cost effective process based on the affinity of cholesterol and other sterols for phospholipid bilayers. Phospholipid aggregates are contacted with, for example, a sterol-containing fat or oil in an aqueous environment and then mixed. Following adequate mixing, the sterol-reduced fat or oil is separated from the aqueous separation mixture. Alternatively, the correspondingly sterol-enriched phospholipid also may be isolated from the aqueous separation mixture.

25 Claims, 1 Drawing Sheet

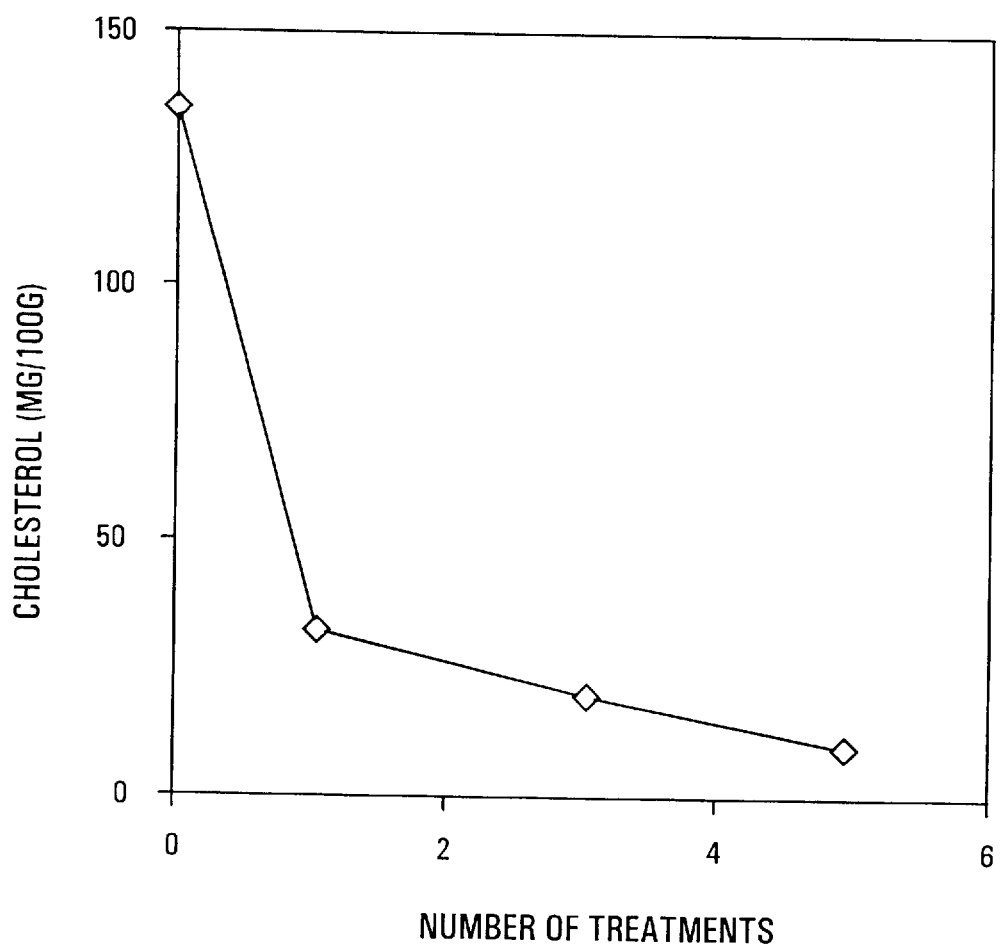

PHOSPHOLIPID-BASED REMOVAL OF STEROLS FROM FATS AND OILS

BACKGROUND OF THE INVENTION

Cholesterol is known to be an important contributor to coronary heart disease, a leading cause of death in the United States. As a result, many consumers are aware of the benefits of maintaining a diet that is low in saturated fat and cholesterol. According to one survey, 48% of US adults try to limit the amount of dietary cholesterol. Council for Agricultural Science and Technology Report #107, November 1985. Although dietary cholesterol intake does not determine blood cholesterol levels in 70–80% of U.S. adults, a significant market for reduced cholesterol products remains for 20–30% of U.S. adults. Sperber, *Food Processing*, November 1989, page 155.

As the link between high serum cholesterol levels and heart disease has become increasingly apparent, cholesterol-free and cholesterol-reduced food products have become more attractive to consumers, and food products that have no or reduced cholesterol are gaining popularity as well as an increasing share of the market. Consequently, removal or reduction of cholesterol in high cholesterol foods has the potential to substantially increase marketability and value. This is particularly true for such high cholesterol foods as marine fish oils (500–800 mg cholesterol/100 g), butter (250–300 mg cholesterol/100 g), beef tallow (about 110 mg cholesterol/100 g), lard (about 100 mg cholesterol/100 g) and egg yolks (about 5.2 g cholesterol/100 g (dry weight)).

Many fish oils contain essential omega-3 fatty acids such as docosahexaenoic acid (DHA) and eicosapentaenoic acid (EPA), which are gaining importance as "nutraceuticals," i.e., food substances which, when ingested, are beneficial in treatment or prevention of disease. The benefits of increasing dietary DHA and EPA include reduction of blood pressure and plasma triacylglycerols, and alleviation of autoimmune diseases such as arthritis. DHA is an important structural component in the membranes of the eye and brain, and is very important in the development of infants. McNeill et al., *J. Am. Oil Chem. Soc.* 73: 245–51 (1996). Unfortunately, many fish oils display very high levels of cholesterol (see above), such that in order to obtain the benefits of DHA, EPA and other omega-3 fatty acids in fish oils, one must also ingest large quantities of cholesterol. Thus, removal of cholesterol from fish oils, without adversely affecting the omega-3 fatty acids and other beneficial constituents, would enhance the nutraceutical character of fish oil and would be particularly valuable from the perspective of human health.

The requirements for awarding a product a reduced-cholesterol or cholesterol-free label are stringent. From the labeling guidelines given below, the importance of high efficiencies in cholesterol removal is clear:

Cholesterol Free: <2 mg cholesterol & 2 g or less saturated fat per serving

Low Cholesterol: 20 mg or less cholesterol & 2 g or less saturated fat per serving Reduced Cholesterol: >25% less cholesterol & 2 g or less saturated fat per serving than a comparison food

*The Chemist*, Vol. 71, No. 5, July, 1994 (newsletter published by The American Institute of Chemists, Inc.).

The removal or reduction of cholesterol is not a trivial matter. Several different techniques to accomplish this task have been developed, each with varying levels of success. One such method, disclosed in Marschner et al., U.S. Pat. No. 4,804,555, involves steam distillation. In this process the oil or fat is heated to 500° F. under high vacuum. Then the oil is made into a thin film and brought into contact with 1 to 15% steam under counter current conditions. This results in a 65% or more reduction of cholesterol. The high temperatures, however, can degrade the product by isomerizing cis double bonds present in triacylglycerols into trans double bonds. The high temperatures also can lead to polymerization and oxidation of various constituents, including cholesterol not removed in the processing steps. Oxidized cholesterol, even more than unoxidized cholesterol, is considered particularly detrimental to human health. Marine fish oils are especially vulnerable to these various forms of product degradation induced by high temperatures. The steam distillation process is energy intensive and engenders significant operating costs. Furthermore, since appreciable amounts of cholesterol remain after distillation, the resulting product may not be entitled to a cholesterol-free label.

Another method of cholesterol removal involves extraction with supercritical $CO_2$. Sperber, "New Technologies for Cholesterol Reduction," *Food Processing*, November 1989, pages 155–60. Here, the $CO_2$ is converted into a supercritical fluid using high pressures (4000–5000 psi). The supercritical $CO_2$ has unique solvating characteristics and is used to selectively remove the cholesterol from dairy and animal products. The efficiency of such an extraction can be as high as 98%. However, installation of the necessary equipment requires a substantial capital investment and the operating costs are also substantial. See also McLachlan et al., U.S. Pat. No. 5,024,846 for another method of separating cholesterol from lipids using supercritical $CO_2$.

Another method, disclosed in Wrezel, U.S. Pat. No. 5,128,162, involves chemical reaction and extraction of cholesterol from oils. In a first step, the cholesterol containing oil is reacted with a polybasic acylating agent. This converts the cholesterol into an acidic monoester of the corresponding polybasic acid. In a second step, this acidic cholesterol derivative is extracted with a base and separated by centrifugation. The chemical requirements, relatively complex procedure, and generation of waste can add significant costs to the process.

Modified cyclodextrin polymers and hydrocolloid extractants such as galactomannoses have also been used successfully to extract cholesterol. Other methods include use of calcium or magnesium bromide salts to precipitate cholesterol, as well as extraction using modified vegetable oils. *Trends in Food Science and Technology* 7: 30 (1996).

SUMMARY OF THE INVENTION

The invention features a novel method of reducing the sterol, for example cholesterol, content of a fat/oil product. Representative fat/oil products include without limitation liquid beef tallow or other animal tallow, lard, fish oil, egg yolk, butter and cheese. The method is applicable to a variety of sterols, including without limitation natural or synthetic plant sterols (phytosterols, e.g., β-sitosterol, campestrol and stigmasterol), mycosterols and animal sterols including cholesterol. The term "sterol" also includes chemically modified or derivatized sterols, provided such molecules are partitionable into the phospholipid aggregates as described below.

In the methods of the invention, the fat/oil product is contacted with a preparation of phospholipid aggregate to form an aqueous separation mixture. The aqueous separation mixture is mixed for a time sufficient to selectively reduce the sterol content of the fat/oil product through partitioning of the sterol into the phospholipid aggregate portion of the aqueous separation mixture. Following this, the sterol-reduced fat/oil is removed from the aqueous separation mixture. Alternatively, the correspondingly sterol-enriched phospholipid may also be isolated from the aqueous separation mixture and used for a variety of purposes as described below.

The preparation of phospholipid aggregate may comprise a combination of aggregated phospholipid and water. The aggregated phospholipid may comprise one or more phospholipid species, or may comprise a total phospholipid fraction such as lecithin. Soybean lecithin is a particularly useful phospholipid in the present invention. If lecithin is used in the preparation of phospholipid aggregate, the weight ratio of lecithin to water can be about 1:0.2 to about 1:5, more preferably about 1:1 to about 1:2.

The steps of the method can be performed at ambient temperature if desired. The procedures can be repeated through two or more cycles to attain a desired level of sterol reduction. Alternatively, the method can be performed under conditions of counter-current extraction.

As described herein, the invention provides a number of advantages. For example, since the steps of the method in many cases can be performed at ambient temperatures, costs involved in heating are minimized as is the possibility of thermal degradation of the product. By minimizing degradation of non-sterol components remaining after extraction, the method is particularly useful for enhancing the nutraceutical value of a fish oil having both cholesterol and essential omega-3 fatty acids. The process reduces the cholesterol content of the fish oil, but leaves intact the DHA, EPA and other omega-3 fatty acids found to be beneficial for human health.

Soybean lecithin, which may be used in the preparation of phospholipid aggregate, is a plant oil refining byproduct and is both abundant and relatively inexpensive. Additionally, a minimal amount of equipment is required, and since all required materials are food grade, the methods require no special precautions regarding handling, waste disposal, or contamination of the final product(s).

The technology additionally is capable of producing reduced-cholesterol or cholesterol-free fats and oils without altering the stability or flavor characteristics (e.g., taste, texture, Active Oxygen Method (AOM) hours). The combination of vegetable oils and cholesterol-free animal fats may provide a variety of high stability fats suitable for solid applications such as trans fatty acid-free margarines and shortenings. The technology may also facilitate development of cholesterol-free ice cream and cheese from cholesterol-removed butter.

Other advantages and features of the invention will be apparent from the following description and from the claims.

BRIEF DESCRIPTION OF THE FIGURE

FIG. 1 depicts the effect of multiple cycles of extraction on cholesterol content.

DETAILED DESCRIPTION

Sterols such as cholesterol may be removed from a variety of animal and plant products in a manner that is efficient and cost effective. The process is based on the affinity of amphipathic molecules such as sterols for phospholipid bilayers. The present process achieves significant reductions in sterol levels by allowing for molecular interaction of a sterol-containing substrate with aggregated phospholipid and water. The molecular structure of this aggregated phospholipid mixture has a high affinity for cholesterol and other sterols, and can selectively remove such molecules from fats and oils.

The procedure provides for relatively facile removal of cholesterol and other sterols from a variety of plant and animal products, yet retains significant technical and economic advantages over other techniques. Since the extractions can be performed at ambient temperatures, many side reactions that may occur at higher temperatures (e.g., isomerization, discoloration and product breakdown) can be avoided. Thus, although the methods are useful for a wide variety of animal and plant products, they are particularly useful for "sensitive" oils such as marine fish and other oils and oil blends that readily oxidize or otherwise degrade under harsher conditions. The process is very efficient and requires a minimal amount of capital investment and energy to operate.

The invention is applicable to any product having fats and/or oils containing sterols such as cholesterol. Such products include without limitation plant oils, animal tallow, lard, fish oils, egg yolk, butter and cheese, and may also include blends of animal products with plant oils. Marine fish oils treatable with the methods of the present invention include without limitation Anchovy, Horse Mackerel, Menhaden, Sardine/Pilchard, Capelin, Herring, Mackerel, Norway Pout, Sandeel and Sprat. Plant (e.g., vegetable) oils contain plant sterols (phytosterols) that also may be removed using the methods of the present invention. Although native plant oils do not ordinarily contain significant amounts of cholesterol, in the food industry such oils may end up in vegetable oil waste that does contain cholesterol. Such cholesterol-containing plant oils also may be treated with the methods of the present invention. Thus, the invention is applicable to any fat- and/or oil-containing product having significant levels of sterols such as cholesterol.

As used herein, the term "fat/oil product" includes any fat product, oil product, or product having both fat and oil components, provided such product includes significant levels of cholesterol or other sterols. The term "fat/oil product" also includes by-products and intermediate-stage products obtained during the refining or other processing of fats and/or oils, provided such products possess significant levels of cholesterol or other sterols. For example, the term "fat/oil product" includes sterol-containing distillate fractions that may be obtained during deodorization processing of vegetable oil or other oils.

The invention is applicable to a fat/oil product at any stage of a commercial processing cycle. For example, the process of the present invention may be applied to refined, bleached and deodorized oils ("RBD oils"), or to any stage of processing prior to attainment of RBD status. Although RBD oil may have an altered density compared to pre-RBD oil, the processes of the present invention are readily adapted to either RBD or pre-RBD oils, or to various other fat/oil products, by variation of phospholipid content, phospholipid composition, phospholipid:water ratios, temperature, pressure, mixing conditions, and separation conditions as described below. The effectiveness of the various conditions employed is readily monitored by measuring the cholesterol content of end products resulting from the disclosed procedures, including if desired relatively small-scale test runs. Cholesterol content may be measured by any accepted analytical procedure, including without limitation gas chromatography.

As used herein, the term "reduce" includes but is not limited to reduction to an effective level of zero, e.g., reduction of cholesterol to a level permitting attachment of a "Cholesterol Free" label.

The methods of the present invention include contacting a fat/oil product with a preparation of phospholipid aggregate to form an aqueous separation mixture. A variety of phospholipids may be used in the methods of the present invention, including without limitation phosphatidyl choline (PC), phosphatidyl ethanolamine (PE), N-acylphosphatidyl ethanolamine (NAPE), phosphatidyl serine (PS), phosphatidyl inositol (PI), phosphatidyl glycerol (PG), diphosphatidyl glycerol (DPG), phosphatidic acid (PA) and plasmalogen. These and other phospholipids are described, for example, in Szuhaj and List (eds.), Lecithins, American Oil Chemists Society (1985), incorporated herein in its entirety by reference (hereinafter "Szuhaj and List").

The phospholipids may be used individually or in various combinations, and may be obtained from "natural" sources (e.g., soybean lecithin) or from chemical synthesis. The phospholipids may be in the form of relatively unpurified mixtures of phospholipids and other constituents (e.g., crude commercial lecithins obtained from the refining of soybean oil and other vegetable oils such as sunflower and canola), or may be purified to various degrees. In addition, phospholipids including those found in crude soybean lecithins or other crude commercial lecithins may be chemically modified. Lecithins, other phospholipid preparations, or individual phospholipids purified from natural sources or obtained by chemical synthesis, contain one or more functional groups susceptible to chemical modification, e.g., carbon-carbon double bonds, esters, phosphonate esters, amines and hydroxyl groups. Chemical modification of phospholipids can be compatible with the present methods, provided that sterols such as cholesterol retain their affinities for such chemically modified phospholipids. Thus, phospholipids that have been acetylated, hydroxylated, hydrolyzed (e.g., to produce lysophospholipids), hydrogenated, halogenated, phosphorylated, sulfated epoxidated, ethoxylated, or otherwise modified are potentially useful in the present methods and are included within the meaning of the term "phospholipid" as used herein. Various natural and synthetic phospholipids, including various types of lecithins, may be obtained commercially, for example from CALBIOCHEM®, La Jolla, Calif., USA and from SIGMA® Chemical Company, St. Louis, Mo., USA.

In a preferred embodiment, lecithin is employed as a source of phospholipids to selectively remove cholesterol from fats and oils. In common usage, the term "lecithin" refers to the entire phospholipid fraction obtained from natural sources such as soybean, cotton seed, corn, wheat germ, oat, barley, sunflower, rapeseed, canola, linseed, peanut, palm kernel, egg yolk, milk and brain. Generally these fractions include a mixture of polar and neutral lipids with a polar lipid content (as defined by insolubility in acetone) of at least 50%. The art has also used the term "lecithin" as the common name for phosphatidyl choline. The term "lecithin" as used herein refers to the first usage, i.e., the entire phospholipid fraction obtained from selected vegetable oils or other appropriate sources. See Chapter 2 of Szuhaj and List. It is to be noted, however, that phosphatidyl choline is an appropriate phospholipid for use in the present methods, either alone or in combination with other phospholipids.

Commercial soybean lecithin, a preferred source of phospholipids, is obtained from the refining of soybean oil. Crude soybean oil generally contains about 1.0 to 3.0 weight percent phospholipids. When the crude oil is refined, the first step generally is to remove the phospholipids. This step, often called "degumming," is accomplished by first adding water to the crude oil. The water hydrates the phospholipids and makes them less soluble in the oil. The denser phospholipids and water are then separated from the less-dense oil, typically by centrifugation. Removal of the water from the dense phase results in a product having approximately equal amounts of phosphatidyl choline, phosphatidyl ethanolamine, and inositol phosphatides. Partially refined soybean oil is commonly added back to produce a liquid product that is flowable at room temperature (sometimes called "fluidized lecithin"). Commercial fluid soybean lecithin contains about 50 to about 65 weight percent phospholipids and a small amount (generally less than about 5 weight percent) of various carbohydrates, mineral salts, protein materials, free fatty acids, sterols, and water. The remainder of commercial soybean lecithin is soybean oil.

Various lecithin powders enriched for phospholipid content are available commercially and may also be used in the present methods. Such lecithin powders are also within the scope of the term "lecithin" as used herein. The powders are typically derived by fractionation, for example acetone fractionation, of crude lecithins such as commercial soybean lecithin, and may contain from about 60% to over 95% phospholipid.

Another commercial source of phospholipids is the class of products resulting from modification of soybean lecithin to improve its hydrophilic properties. Various approaches have been taken to effect these modifications. For example, soybean lecithin may be chemically or enzymatically modified, e.g., via reaction with maleic anhydride. Certain components may be removed from commercial soybean lecithin. Alternatively, another approach is to add various components, for example nonionic emulsifiers, to the commercial soybean lecithin. Such emulsifiers include, without limitation, polyoxyalkylene monoglyceride, polyoxyalkylene diglycerides, and the polyoxyethylene derivatives of partial fatty acid esters. These modified lecithins are also included in the term "lecithin" as used herein.

A lecithin paste may be prepared, for example, by mixing commercial soybean lecithin with water and homogenizing with a stirring device such as a mechanical stirrer, shear mixer, vibrational mixer or sonicator. Then, a fat/oil product is added to the lecithin paste to form an aqueous separation mixture. The separation mixture is thoroughly mixed using a mixing device such as a shear mixer, mechanical stirrer, vibrating mixer or sonicator. Although generally unnecessary, combinations of mixing methods may be used with satisfactory results. After mixing for a sufficient period of time, the cholesterol-reduced fat/oil is separated from the cholesterol-enriched lecithin and the remainder of the aqueous separation mixture using conventional techniques such as centrifugation or filtration.

Fat/oil products should be kept at temperatures that maintain a liquid state during the procedures. For example, fat/oil products such as beef tallow, butter and lard may be melted at an appropriate temperature (e.g., about 40°–50° C.), then maintained at about 20°–50° C. during mixing in order to maintain the fat/oil product in a liquid state. For fat/oil products normally in a liquid state at room (ambient) temperature, e.g., fish oils and commercially available "liquid" beef tallow preparations, it may not be necessary to employ any heating above ambient temperature. In an alternative embodiment, a lecithin paste is prepared by adding water to lecithin, then heating to about 60° C. prior to homogenization with a mechanical stirrer to form the paste. The heating step facilitates homogenization. The remaining operations are then performed at ambient temperatures as described above.

Preferably the aqueous separation mixture is mixed with vigorous mechanical stirring for between five min and 100 hr, more preferably between 10 min and 30 hr, and most preferably for about 10 min to about 1 hr. These times may be varied depending upon the vigor with which the aqueous separation mixture is mixed and the temperature at which the mixture is maintained. The cholesterol-enriched lecithin may be separated from the cholesterol-reduced fat/oil by centrifugation. The centrifugation times and speeds may be varied as desired. Preferably the centrifugation is at between about 100×g and about 100,000×g, more preferably between about 500×g and about 50,000×g, and most preferably between about 1,000×g and about 11,000×g. Alternatively, the aqueous separation mixture, following adequate mixing, may be permitted to stand for an extended period to allow for spontaneous gravity-driven separation.

The extent of cholesterol removal can be varied depending upon the lecithin to water ratio, the ratio of lecithin paste to fat/oil product, the contact surface area, time of contact (mixing) and, as described below, the number of cycles through which a fat/oil product is taken. In a representative process, treating 20 grams of liquid beef tallow with 4 grams of a 1:1 lecithin-water paste for 5 cycles results in about a 95% reduction in cholesterol level. The amounts of fat/oil and lecithin may be proportionately scaled up or down as desired.

As desired, various electrolytes such as acids, bases and/or salts may be added to the water to alter the polar characteristics of cholesterol or other sterols. This can alter the distribution coefficient of the amphipathic sterol between the phospholipid and oil/fat phases. In addition, various emulsifiers such as monoglycerides may be incorporated in the aqueous separation mixture to improve the sterol extraction efficiencies.

It is to be emphasized that the aqueous separation mixture may be formulated in various ways without departing from the invention. The phospholipid (e.g., lecithin) may be mixed with water, as described above, to form an aqueous preparation of phospholipid aggregate (e.g., lecithin paste), and then added to the fat/oil product to form an aqueous separation mixture. In this embodiment, the water in the aqueous separation mixture derives from the water that was added initially to the phospholipid to form the preparation of phospholipid aggregate. Some fat/oil products (e.g., butter) inherently possess significant quantities of water. In these cases, an essentially "dry" phospholipid, for example a dry phospholipid powder, may be added directly to the fat/oil product to form an aqueous separation mixture that includes phospholipid aggregate. Alternatively, water may be added to the fat/oil product and phospholipid added to the water/fat/oil mixture to form the aqueous separation mixture. In an alternative embodiment, water can be added after addition of phospholipid to a fat/oil product in order to form the aqueous separation mixture. In a still further alternative embodiment, water, phospholipid and a fat/oil product can be added together simultaneously to form the aqueous separation mixture. In all cases, the fat/oil product comes into contact with a preparation of phospholipid aggregate that serves to sequester sterols present in the fat/oil product.

It is also to be noted that various vegetable oil-derived "gums" (see, e.g., Szuhaj and List, Chapter 2; Erickson (ed.), *Practical Handbook of Soybean Processing and Utilization*, AOCS Press and United Soybean Board, Chapter 10, 1995, incorporated herein by reference) constitute pre-made lecithin/water "pastes" that may be used in the present methods. If the process as described herein is installed near a vegetable oil refining plant, the gums (obtained for example by water degumming of soybean oil) can be directly fed into the system. This is even more cost-effective than use of commercially available lecithins, although commercially available lecithins are very cost-effective in the present processes.

If vegetable oil-derived gums are used, then it may not be necessary to add water to the preparation of phospholipid aggregate or to the fat/oil product, since the final separation mixture may be "aqueous" by virtue of the water present in the initial preparation of phospholipid aggregate (gum). Or, smaller amounts of water may be added, as desired, depending on the initial water content of the preparation of phospholipid aggregate.

In a further alternative embodiment, a phospholipid-containing plant oil may be mixed with a cholesterol-containing fat/oil product. The resulting mixture is water degummed according to standard methods (e.g., Erickson (ed.), *Practical Handbook of Soybean Processing and Utilization*, AOCS Press and United Soybean Board, Chapter 10, 1995). This results in formation of phospholipid aggregates in the mixture which, in the presence of the aqueous environment resulting from the water degumming procedure, sequesters the cholesterol or other sterols from the fat/oil. If desired, this aqueous separation mixture can be further mixed (beyond the mixing that occurs during normal water degumming), by stirring or other means, to enhance the contact of the phospholipid aggregates with the cholesterol-containing oil or fat. The cholesterol-enriched gums are then separated from the fat/oil as described above. This "water degumming procedure" as performed on the mixture effectively removes both the phospholipids and cholesterol (or other sterols) in a single process. The resulting oil mixture can be refined in a regular fashion (see, e.g., Erickson (ed.), *Practical Handbook of Soybean Processing and Utilization*, AOCS Press and United Soybean Board, 1995), resulting in a cholesterol-free or reduced-cholesterol vegetable tallow, or other refined products as desired.

The cycle of forming an aqueous separation mixture, mixing and separating can be repeated as often as desired in order to obtain the desired level of reduction in sterol (e.g., cholesterol) content. For example, following separation and isolation of a cholesterol-reduced fat/oil from a first extraction cycle, the same product can be added to a fresh preparation of aggregated phospholipid and the procedures repeated. Each such cycle of extraction provides an incremental reduction in levels of sterols.

Alternatively, the procedures can be performed under conditions of counter current exchange to achieve similar levels of reduction. That is, the cholesterol or other sterol extraction may be performed in a continuous (rather than batchwise) manner to increase the extraction efficiency. Any conventional liquid-liquid counter current exchange arrangement may be employed to this end, including without limitation unagitated columns, mixer-settlers, pulsed columns, rotary agitation columns, reciprocating plate columns, and centrifugal extractors. See for example, Kirk-Othmer, *Encyclopedia of Chemical Technology*, Fourth Edition, 1993, John Wiley & Sons, pages 125–180, incorporated herein by reference. Gravity driven counter current exchange systems are appropriate in many cases, since a sterol-depleted fat/oil typically has a lower density than the corresponding sterol-enriched phospholipid.

It is to be noted that practice of the methods of the present invention yields not only a fat/oil product with reduced levels of sterols such as cholesterol, but also yields a preparation of phospholipid aggregate that is correspondingly enriched in such molecules. Thus, the process constitutes a method for isolating or for obtaining a sterol-enriched preparation of phospholipid such as lecithin. The sterols may be isolated from the phospholipid using any of several known methods. For example, a cholesterol-enriched lecithin of the present invention may be dehydrated, then applied to a silica gel column and extracted with a non-polar solvent to remove and recover the cholesterol. Alternatively, the cholesterol-enriched lecithin may be extracted with a polar solvent such as acetone or methyl acetate, which solubilizes the cholesterol but not the majority of phospholipids. Following separation of the cholesterol from the lecithin, the cholesterol (or other sterol) may be commercialized, for example as a pharmaceutical feedstock. The lecithin, if desired, can be re-cycled back into the sterol removal process described above.

Cholesterol-enriched lecithin is valuable in its own right. For example, the cholesterol-enriched lecithin may be marketed as a feed supplement used, for example, to enhance the growth of young animals. To this end, it is possible to run the extraction methods of the present invention through multiple cycles or through a counter current exchange process, and to re-cycle the resulting cholesterol-enriched phospholipid (e.g., lecithin) back into the process until it is maximally loaded with the desired sterols. This provides a particularly rich source of cholesterol or other sterols that can be further processed as described above.

In an alternative embodiment, the methods of the present invention can be used to isolate phytosterols or other sterols at intermediate steps in oil processing. For example, it is known that phytosterols are lost during deodorization of plant oils. Snyder and Kwon, eds., *Soybean Utilization*, Von Nostran Reinhold Company 1987, pages 68–69. A sterol-containing distillate fraction from, for example, an intermediate stage of processing can be subjected to the sterol-extraction procedures described above. This provides a sterol-enriched lecithin or other phospholipid material that can be further processed in order to recover the extracted sterols.

The invention will be further understood with reference to the following illustrative embodiments, which are purely exemplary, and should not be taken as limiting the true scope of the present invention as described in the claims.

EXAMPLE 1

Distilled water and soybean lecithin (Lipotin A/UB, SR# 19697/1, from Lucas Meyer, Decatur, Ill.) were added simultaneously in various ratios to 20 grams of liquid beef tallow ("Fluid Fry" Shortening, Product No. 54084, Rustco Products Co./Park Food LP, Denver, Colo.). The samples were subjected to vigorous stirring for 1 hour at ambient temperature with a magnetic stirrer, after which they were centrifuged in a benchtop centrifuge (IEC clinical centrifuge) for 10 minutes at 3000 rpm (approximately 1,000×g).

Following centrifugation, the top tallow layer was collected and analyzed for cholesterol content using gas chromatography. The tallow samples were subjected to single treatments only. This allowed the maximum amount of cholesterol removed in a single treatment to be examined under varying conditions. Results are shown in Table 1, below:

TABLE 1

Cholesterol Removal from Tallow in One Treatment

| Sample ID | Cholesterol* mg/100 g | Lecithin:Water Weight Ratio | Lecithin:Tallow Weight Ratio | % Cholesterol Removed |
|---|---|---|---|---|
| 1 | 121.8 | Control | Control | Control |
| 2 | 59.3 | 1:1 | 1:5 | 50.99 |
| 3 | 84.3 | 1:2 | 1:10 | 30.33 |
| 4 | 92.4 | 1:1 | 1:20 | 23.63 |
| 5 | 102 | 1:3 | 1:40 | 15.7 |
| 6 | 68.5 | 1:1 | 1:10 | 43.38 |

*Cholesterol remaining at end of procedure; the cholesterol level of Sample ID 1 represents the baseline from which the % cholesterol removed was calculated.

EXAMPLE 2

In a second experiment, an appropriate amount of distilled water was added to the same commercial soybean lecithin as used in Example 1, then heated to 60° C. The mixture was homogenized with a mechanical stirrer (Caframo type RZR1) for 15 min to form a lecithin-water paste. The remaining procedures were performed at ambient temperature. A weighed amount of the lecithin-water paste was added to various amounts of the same type of liquid beef tallow as used in Example 1, and mixed well with a high shear mixer for 10 min. Next, the sample was centrifuged for 10 minutes at 10,000 rpm in a Beckman Model J-21C floor model centrifuge (approximately 11,400×g). The oil phase was separated from the centrifuge bottles. This once-treated oil was subjected to the lecithin-water paste, mixing, centrifugation and separation process repeatedly a desired number of times. Fresh lecithin-water paste was used for each repetition. Then, the resulting cholesterol-depleted oils were subjected to cholesterol analysis via gas chromatography. The above process was repeated while changing such variables as the ratios of lecithin to water, lecithin to tallow, and the number of extractions performed. Results are provided in Table 2, below:

TABLE 2

Cholesterol Removal: Variable Numbers of Treatments

| Sample ID | Cholesterol mg/100 g | # of treatments | Lecithin: water* | Lecithin: tallow* | % Cholesterol Removed |
|---|---|---|---|---|---|
| 2710-33-I | 31.5 | 1 | 1:1 | 5:1 | 76.8 |
| 2710-33-III | 18.6 | 3 | 1:1 | 5:1 | 86.3 |
| 2710-33-V | 8.7 | 5 | 1:1 | 5:1 | 93.6 |
| 2710-33-VI | 88 | 3 | 1:2 | 10:1 | 35.3 |
| 2710-33-VII | 109 | 3 | 1:4 | 20:1 | 19.9 |
| 2710-33-VIII | 136 | Control | Control | Control | Control |

*Ratios are by weight.

The results demonstrate that the water and aggregated lecithin mixtures are effective for removing cholesterol from a liquid animal tallow. The effect of increasing the number of lecithin and water treatments can be seen in FIG. 1.

EXAMPLE 3

In a third set of experiments, phosphatidyl choline derived from egg yolk (Sigma Chemical Co., St. Louis, Mo.; No. P-9671; phosphatidyl choline content approximately 60%) was used a source of phospholipid. A phosphatidyl choline-water paste was prepared by mixing water and phosphatidyl choline in a 2:1 weight ratio, using a mechanical stirrer. The phosphatidyl choline used in this experiment contained only trace amounts of oil, whereas the soybean lecithin used in the previous Examples contained approximately 50% by weight oil. The phospholipid content of a paste having a 2:1 ratio of water:phosphatidyl choline was therefore approximately equal to the phospholipid content of a 1:1 water-:lecithin paste as used in the previous Examples. Liquid tallow (same type as in Examples 1 and 2) was treated with the phosphatidyl choline-water paste using phosphatidyl choline-to-tallow ratios of 1:20 and 1:10. The paste was rapidly stirred with the tallow for 30 min at ambient temperature with a mechanical stirrer, then centrifuged at ambient temperature in a Beckman Model J-21C floor model centrifuge for 10 min at 10,000 rpm (approximately 11,400× g). The supernatant oil was then separated and analyzed for cholesterol content by gas chromatography. Results are provided in Table 3, below:

TABLE 3

Cholesterol Removal Using Egg Yolk Phosphatidyl Choline

| Sample ID | Cholesterol mg/100 g | Lecithin: water* | Lecithin: tallow* | % Cholesterol Removed |
|---|---|---|---|---|
| 0 | 133.9 | Control | Control | Control |
| 1 | 120 | 1:2 | 1:20 | 10.4% |
| 2 | 91 | 1:2 | 1:10 | 32.1% |

*Ratios are by weight.

The results demonstrate that the water:phosphatidyl choline paste was effective for removing cholesterol from liquid animal tallow. However, due to the presence of cholesterol in the egg yolk-derived phosphatidyl choline (1,000–2,000 ppm cholesterol), the % reduction in cholesterol was somewhat less than the % reduction using soybean lecithin. Nevertheless, the experiments indicate that a variety of phospholipid sources may be employed to obtain significant reductions in cholesterol.

EXAMPLE 4

In a fourth set of experiments, butter was used as the fat/oil product in place of liquid beef tallow, and a powdered lecithin that was phospholipid enriched through acetone extraction of soybean lecithin was used in place of the commercial soybean lecithin employed in Examples 1 and 2.

Best Yet® Sweet Cream Butter (Scrivner, Inc., Oklahoma City, Okla.) was melted and used directly, or was fractionated as follows: 184 g of butter was melted by heating in a steam bath to 45°–50° C., then centrifuged at 5,000 rpm in a Beckman Model J-21C floor model centrifuge (approximately 2,860×g) for 10 min at room temperature. Following centrifugation, the liquid butter was resolved into two layers—a "fat portion" (144 g) and a "water portion" (40 g). Aliquots of each layer as well as the unfractionated butter were analyzed for cholesterol content by gas chromatography. The unfractionated butter was found to have a cholesterol content of about 280 mg/100 g (282 mg/100 g in a first sample; 279 mg/100 g in a duplicate sample). The fat portion possessed a cholesterol content of 321 mg/100 g, while the water portion exhibited 33.6 mg cholesterol/100 g.

Deionized water and powdered lecithin (Centrolex® F, at least 95% phospholipids, available from Central Soya Inc., Ft. Wayne, Ind.) were mixed in a 1:1 ratio at room temperature to form a lecithin paste. The lecithin paste was added to a sample of the above-described fat portion in a 10:1 weight ratio of fat portion:lecithin. Additionally, dry lecithin powder was added to a sample of unfractionated liquid butter in a 5:1 weight ratio of butter:dry lecithin. Dry lecithin powder was used for this sample since unfractionated butter possesses a significant amount of water, as described above.

The resulting aqueous separation mixtures were subjected to vigorous stirring for 15 min at 55° C. with a mechanical stirrer, after which they were centrifuged at 5,000 rpm in a Beckman Model J-21C floor model centrifuge (approximately 2,860×g) for 10 min at room temperature. Following centrifugation, the top fat layer was collected and analyzed for cholesterol content using gas chromatography.

The unfractionated whole butter subjected to treatment with dry lecithin powder possessed a cholesterol content of 159 mg/100 g following a single extraction cycle.

One of the fat portion samples was taken through five extraction cycles, using fresh lecithin paste in each cycle. This 5×-extracted sample displayed only 8.5 mg cholesterol/100 g, representing a reduction in cholesterol content of over 97%. A significant amount of cholesterol was removed in the first of the five extractions, as the cholesterol content of the lecithin paste remaining following the first extraction was 304 mg cholesterol/100 g paste.

The cholesterol-enriched lecithin from the first of the five extractions described above (i.e., 304 mg cholesterol/100 g paste) ("lecithin1"), and the cholesterol-enriched lecithin from the second of the five extractions ("lecithin2"), were solvent-extracted as follows. Cholesterol-enriched lecithin paste in the amount of 50 g was mixed with 50 g acetone using vigorous mechanical stirring. The lecithin/acetone mixture was centrifuged at 5,000 rpm in a Beckman Model J-21C floor model centrifuge (approximately 2,860×g) for 10 min at room temperature. The resulting cholesterol-laden acetone fraction was separated from the lecithin fraction by decanting. The bottom lecithin fraction was extracted twice more, as described above, using 50 g fresh acetone for each extraction. The 3 acetone fractions were combined and the solvent (acetone) was evaporated, leaving an oil residue. Lecithin1 yielded 4.73 g of oil, while lecithin2 yielded 4.28 g of oil.

The two oil residues were combined and analyzed for cholesterol content using gas chromatography. The combined oil residues (9.01 g) were found to possess 891 mg cholesterol/100 g oil. The lecithin fraction derived from the first acetone extraction of lecithin1 exhibited 172 mg cholesterol/100 g lecithin. Thus, a substantial amount (e.g., about 44%) of the cholesterol was removed from the cholesterol-enriched lecithin by a single acetone extraction.

The above-described results are summarized in Table 4, below:

TABLE 4

Cholesterol Removal from Butter

| Sample Number | Description | Cholesterol (mg/100 g) |
|---|---|---|
| 1 | fat portion | 321 |
| 2 | water portion | 33.6 |
| 3 | 5x extracted fat portion | 8.5 |
| 4 | whole butter/dry lecithin | 159 |
| 5 | regular whole butter | 282 |
| 6 | first lecithin paste | 304 |
| 7 | acetone extract of lecithin paste | 891 |
| 8 | acetone-extracted lecithin paste | 172 |
| 9 | regular whole butter (duplicate) | 279 |

The results demonstrate that cholesterol is effectively removed from butter using the methods of the present invention. Thus, the methods are effective not only for fat/oil products normally liquid at ambient (room) temperatures, but also for fat/oil products that must be heated to maintain a liquid state. In addition, the results demonstrate that cholesterol-enriched lecithin produced by the extraction methods provides a valuable source of cholesterol that is readily isolated through simple solvent extraction.

What is claimed is:

1. A method of reducing the sterol content of a fat/oil product, comprising
   a) contacting said fat/oil product with a preparation of phospholipid aggregate to form an aqueous separation mixture;
   b) mixing said aqueous separation mixture for a time sufficient to selectively reduce said sterol content of said fat/oil product; and
   c) separating said sterol-reduced fat/oil from said aqueous separation mixture.

2. The method of claim 1, wherein said sterol is cholesterol.

3. The method of claim 1, wherein said sterol is a phytosterol.

4. The method of claim 1, wherein said preparation of phospholipid aggregate comprises a combination of aggregated phospholipid and water.

5. The method of claim 1, wherein said preparation of phospholipid aggregate comprises one or more phospholipids selected from the group consisting of unmodified or chemically modified forms of phosphatidyl choline (PC), phosphatidyl ethanolamine (PE), N-acylphosphatidyl ethanolamine (NAPE), phosphatidyl serine (PS), phosphatidyl inositol (PI), phosphatidyl glycerol (PG), diphosphatidyl glycerol (DPG), phosphatidic acid (PA), plasmalogen, lecithin and vegetable oil-derived gums.

6. The method of claim 5, wherein said phospholipid comprises lecithin.

7. The method of claim 6, wherein said lecithin is selected from the group consisting of soybean lecithin, corn lecithin, rapeseed lecithin, sunflower lecithin, cotton seed lecithin, peanut lecithin, egg yolk lecithin, milk lecithin and brain lecithin.

8. The method of claim 7, wherein said lecithin comprises soybean lecithin.

9. The method of claim 4, wherein said fat/oil product is selected from the group consisting of animal tallow, lard, fish oil, egg yolk, butter and cheese.

10. The method of claim 4, wherein said combination of aggregated phospholipid and water consists essentially of lecithin and water in a weight ratio of about 1:0.2 to about 1:5.

11. The method of claim 10, wherein said ratio is about 1:1 to about 1:2.

12. The method of claim 9, wherein said fat/oil product is liquid beef tallow.

13. The method of claim 1, further comprising repeating steps (a), (b) and (c) for said sterol-reduced fat/oil product.

14. The method of claim 1, wherein steps (a), (b) and (c) are performed under conditions of counter-current extraction.

15. The method of claim 1, wherein steps (a), (b) and (c) are performed at ambient temperature.

16. A method for obtaining sterol-enriched phospholipid, comprising
   a) contacting a sterol-containing fat/oil product with a preparation of phospholipid aggregate to form an aqueous separation mixture;
   b) mixing said aqueous separation mixture for a time sufficient to sequester at least a portion of said sterol from said fat/oil product into said aggregated phospholipid; and
   c) separating said sterol-enriched phospholipid from said aqueous separation mixture.

17. The method of claim 16, wherein said sterol is selected from the group consisting of natural or synthetic animal sterols, phytosterols and mycosterols.

18. The method of claim 17, wherein said sterol is cholesterol.

19. The method of claim 17, wherein said phytosterols comprise at least one sterol selected from the group consisting of β-sitosterol, campestrol and stigmasterol.

20. The method of claim 16, wherein said preparation of phospholipid aggregate comprises a combination of aggregated phospholipid and water.

21. The method of claim 16, wherein said preparation of phospholipid aggregate comprises one or more phospholipids selected from the group consisting of unmodified or chemically modified forms of phosphatidyl choline (PC), phosphatidyl ethanolamine (PE), N-acylphosphatidyl ethanolamine (NAPE), phosphatidyl serine (PS), phosphatidyl inositol (PI), phosphatidyl glycerol (PG), diphosphatidyl glycerol (DPG), phosphatidic acid (PA), plasmalogen, lecithin and vegetable oil-derived gums.

22. The method of claim 21, wherein said phospholipid comprises lecithin.

23. The method of claim 22, wherein said lecithin is selected from the group consisting of soybean lecithin, corn lecithin, rapeseed lecithin, sunflower lecithin, cotton seed lecithin, egg yolk lecithin, milk lecithin and brain lecithin.

24. The method of claim 23, wherein said lecithin comprises soybean lecithin.

25. A method of enhancing the nutraceutical value of a fish oil having cholesterol and essential omega-3 fatty acids, comprising
   a) contacting said fish oil with a preparation of phospholipid aggregate to form an aqueous separation mixture;
   b) mixing said aqueous separation mixture for a time sufficient to selectively reduce said cholesterol content of said fish oil while maintaining said omega-3 fatty acids; and
   c) separating said cholesterol-reduced fish oil from said aqueous separation mixture.

* * * * *